US009012520B2

(12) United States Patent
Prakash et al.

(10) Patent No.: US 9,012,520 B2
(45) Date of Patent: Apr. 21, 2015

(54) SWEETNESS ENHANCERS, COMPOSITIONS THEREOF, AND METHODS FOR USE

(75) Inventors: Indra Prakash, Alpharetta, GA (US); Grant E. DuBois, Rosewell, GA (US); Josef Klucik, Marietta, GA (US); Rafael Ignacio San Miguel, Atlanta, GA (US); Rudolf Johann Fritsch, Atlanta, GA (US); Venkata Sai Prakash Chaturvedula, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 427 days.

(21) Appl. No.: 12/979,917

(22) Filed: Dec. 28, 2010

(65) Prior Publication Data

US 2011/0160311 A1 Jun. 30, 2011

Related U.S. Application Data

(60) Provisional application No. 61/290,370, filed on Dec. 28, 2009.

(51) Int. Cl.
| | | |
|---|---|---|
| A23L 1/236 | (2006.01) | |
| A23L 1/22 | (2006.01) | |
| A23L 1/09 | (2006.01) | |
| A23L 2/60 | (2006.01) | |

(52) U.S. Cl.
CPC ............... *A23L 1/22091* (2013.01); *A23L 1/09* (2013.01); *A23L 1/2366* (2013.01); *A23L 2/60* (2013.01)

(58) Field of Classification Search
CPC ................................. A23L 2/60; A23I 1/2366
USPC .......................................... 514/777; 426/541
See application file for complete search history.

(56) References Cited

U.S. PATENT DOCUMENTS

| | | | |
|---|---|---|---|
| 4,612,942 A | 9/1986 | Dobberstein et al. | |
| 4,990,354 A | 2/1991 | Bakal et al. | |
| 6,432,464 B1 | 8/2002 | Andersen et al. | |
| 2008/0292765 A1* | 11/2008 | Prakash et al. | 426/548 |
| 2009/0311686 A1 | 12/2009 | Slack et al. | |

FOREIGN PATENT DOCUMENTS

| | | |
|---|---|---|
| EP | 0154235 | 6/1991 |
| JP | 60199364 | 10/1985 |
| JP | 04222575 | 8/1992 |
| JP | 2002500028 | 1/2002 |
| JP | 2009534018 | 9/2009 |
| WO | WO 9934689 | 7/1999 |
| WO | WO 2007121604 | 11/2007 |
| WO | WO 2008049256 A1 | 5/2008 |
| WO | WO 2009023975 A2 | 2/2009 |
| WO | WO 2010135378 A1 | 11/2010 |
| WO | WO 2011009081 A1 | 1/2011 |
| WO | WO 2011028671 A1 | 3/2011 |

OTHER PUBLICATIONS

Prakash et al.; Title: "Development of rebiana, a natural, non-caloric sweetener", vol. 46, S75-S82, Epub May 16, 2008.*
International Preliminary Report on Patentability for PCT/US2010/062210 (Jul. 4, 2012).
International Search Report for PCT/US2010/062210 (mailed Apr. 26, 2011).

* cited by examiner

*Primary Examiner* — Johann R Richter
*Assistant Examiner* — Yanzhi Zhang
(74) *Attorney, Agent, or Firm* — King & Spalding (57) ABSTRACT

Disclosed herein are sweetener compositions comprising at least one sweetener and at least one sweetness enhancer chosen from terpenes (such as sesquiterpenes, diterpenes, and triterpenes), flavonoids, amino acids, proteins, polyols, other known natural sweeteners (such as cinnamaldehydes, selligueians, hematoxylins), secodammarane glycosides, and analogs thereof, wherein the at least one sweetness enhancer is present in the composition in an amount at or below the sweetness detection threshold level of the sweetness enhancer, and the at least one sweetener and the at least one sweetness enhancer are different. Also disclosed herein are methods for enhancing sweetness of a composition, comprising combining at least one sweetener and at least one sweetness enhancer chosen from terpenes (such as sesquiterpenes, diterpenes, and triterpenes), flavonoids, amino acids, proteins, polyols, other known natural sweeteners (such as cinnamaldehydes, selligueians, hematoxylins), secodammarane glycosides, and analogs thereof, wherein the at least one sweetness enhancer is present in the composition in an amount at or below the sweetness detection threshold level of the at least one sweetness enhancer, and the at least one sweetener and the at least one sweetness enhancer are different.

11 Claims, 1 Drawing Sheet

Sweet Taste Intensity

SWEETNESS ENHANCERS, COMPOSITIONS THEREOF, AND METHODS FOR USE

This application claims the benefit of priority to U.S. Provisional Application No. 61/290,370 filed on Dec. 28, 2009, which is incorporated in its entirety herein.

The present disclosure relates to compositions having enhanced sweetness comprising at least one sweetener and at least one sweetness enhancer chosen from terpenes (such as sesquiterpenes, diterpenes, and triterpenes), flavonoids, amino acids, proteins, polyols, other known natural sweeteners (such as cinnamaldehydes, selligueians, and hematoxylins), secodammarane glycosides, and analogues thereof. The disclosure also relates to methods of enhancing sweetness of a composition comprising combining at least one sweetener and at least one sweetness enhancer chosen from terpenes (such as sesquiterpenes, diterpenes, and triterpenes), flavonoids, amino acids, proteins, polyols, other known natural sweeteners (such as cinnamaldehydes, selligueians, hematoxylins), secodammarane glycosides, and analogues thereof.

Although sweeteners, such as carbohydrate sweeteners including fructose, glucose, and sucrose, are often used in beverage compositions, these sweeteners may be expensive to purchase and/or may require high transportation and/or storage space costs when purchased in bulk. Moreover, although natural caloric sweetener compositions such as sucrose, fructose, and glucose taste good to most consumers, they are caloric. In addition, carbohydrate sweetener production has a high carbon footprint. Therefore, alternative non-caloric or low-caloric sweeteners have been widely sought after and used as sugar or sucrose substitutes. Many non-caloric or low-caloric sweeteners, however, are prohibitively expensive. Furthermore, there is a demand, for products that comprise natural products, such as natural sweeteners or natural sweetness enhancers.

Accordingly, it may be desirable to identify compounds capable of enhancing or increasing the perception of sweetness of such sweeteners, such as natural and synthetic sweeteners. By combining such compounds with sweeteners, the amount of sweetener needed to obtain a desired degree of sweetness may be reduced significantly, thereby reducing the calories imparted by natural caloric sweeteners or reducing the amounts of low-caloric or non-caloric natural or synthetic sweeteners. Moreover, it may be desirable to identify natural compounds that may enhance the sweetness of synthetic and/or natural sweeteners.

Thus, one aspect of the present disclosure is to address at least one of the above-identified needs by providing compositions comprising at least one sweetener and at least one sweetness enhancer chosen from terpenes (such as sesquiterpenes, diterpenes, and triterpenes), flavonoids, amino acids, proteins, polyols, other known natural sweeteners (such as cinnamaldehydes, selligueains, and hematoxylins), secodammarane glycosides, and analogues thereof in an amount at or below the sweetness detection threshold level of the at least one sweetness enhancer. The at least one sweetener and the at least one sweetness enhancer are different. In some embodiments, the at least one sweetness enhancer may be, but is not limited to, stevia sweeteners, such as stevioside, steviolbioside, rebaudioside A, rebaudioside B, rebaudioside C, rebaudioside D, rebaudioside F, dulcoside A, rubusoside; hernandulcin; pine rosin diperpenoid; mukurozioside; baiyunosdie; phlomisoside, such as phlomisoside I and phiomisodie II; glycyrrhizic acid; periandrins, such as periandrin I, periandrin II, periandrin III, and periandrin IV; osladin; polypodosides, such as polypodoside A and polypodoside B; mogrosides, such as mogroside IV and mogroside V; abrusoside A and abrusoside B; cyclocariosdies, such as cyclocarioside A and cyclocarioside B; pterocaryoside A and pterocaryoside B; flavanoids, such as phyllodulcin, phloridzin, neoastilbin, and dihydroquercetin acetate and its derivatives; amino acids, such as glycine and monatin; proteins, such as thaumatins (thaumatin I, thaumatin II, thaumatin III, and thaumatin IV), monellin, mabinlins (mabinlin I and mabinlin II), brazzein, miraculin, and curculin; polyols such as erythritol; cinnamaldehyde; selligueains, such as selligueain A and selligueain B; and hematoxylin.

For example, the sweetness enhancer is chosen from pine rosin diterpenoids, ploridizin, neoastilbin, dihydroquercetin acetate, glycine, erythritol, cinnamaldehyde, selligueain A, selligueain B, hematoxylin, rebaudioside A; rebaudioside B; rebaudioside C; rebaudioside D; rebaudioside E; dulcoside A; steviolbioside; rubusoside, stevia, stevioside, steviol 13 O-β-D-glycoside, mogroside V, Luo Han Guo, siamenoside, siamenoside I, monatin and salts thereof (monatin SS, RR, RS, SR), curculin, glycyrrhizic acid and its salts, thaumatin I, thaumatin II, thaumatin III, thaumatin IV, monellin, mabinlin I, mabinlin II, brazzein, hernandulcin, phyllodulcin, glycyphyllin, phloridzin, trilobtain, baiyunoside, osladin, polypodoside A, polypodoside B, pterocaryoside A, pterocaryoside B, mukurozioside, mukurozioside IIb, phlomisoside I, phlomisoside II, periandrin I, periandrin II, periandrin III, periandrin VI, periandrin V, cyclocarioside A, cyclocarioside B, suavioside A, suavioside B, suavioside G, suavioside H, suavioside I, suavioside J, labdane glycosides, baiyunoside, gaudichaudioside A, mogroside IV, iso-mogroside, bryodulcoside, bryoside, bryonoside, carnosifloside V, carnosifloside VI, scandenoside R6, 11-oxomogroside V, abrusoside A, abrusoside B, abrusoside C, abrusoside D, abrusoside E, gypenoside XX, glycyrrhizin, apioglycyrrhizin, araboglycyrrhizin, pentadin, perillaldehyde, rebaudioside F; steviol; 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester; 13-[(2-O-β-D-glucopyranosyl-3-O-(4-O-α-D-glucopyranosyl)-β-D-glucopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-hydroxy-kaur-16-en-18-oic acid β-D-glucopyranosyl ester; 13-methyl-16-oxo-17-norkauran-18-oic acid β-D-glucopyranosyl ester; 13-[(2-O-β-D-glucopyranosyl-3-O-β-D-glucopyranosyl-β-D-glucopyranosyl)oxy]kaur-15-en-18-oic acid β-D-glucopyranosyl ester; 13-[(2-O-β-D-glucopyranosyl-3-O-β-D-glucopyranosyl-β-D-glucopyranosyl)oxy]kaur-15-en-18-oic acid; 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid; isosteviol; mogroside IA; mogroside IE; mogroside II-A; mogroside II-E; mogroside III; mogroside V; isomogroside V; 11-oxomogroside; mogrol; 11-oxomogrol; 11-oxomogroside IA; 1-[13-hydroxykaur-16-en-18-oate]β-D-glucopyranuronic acid; 13-[(2-O-β-D-glucopyranosyl-β-D-glucopyranosyl)oxy]-17-hydroxy-kaur-15-en-18-oic acid β-D-glucopyranosyl ester; 13-[(2-O-β-D-glucopyranosyl-β-D-glucopyranosyl)oxy]kaur-16-en-18-oic acid-(2-O-β-D-glucopyranosyl-β-D-glucopyranosyl)ester (rebaudioside E); 13-[(2-O-α-L-rhamnopyranosyl-3-O-β-D-glucopyranosyl-β-D-glucopyranosyl)oxy]kaur-16-en-18-oic acid-(2-O-β-D-glucopyranosyl-β-D-glucopyranosyl) ester; 13-[(2-O-β-D- glucopyranosyl-3-O-β-D-glucopyranosyl-β-D-glucopyranosyl)oxy]kaur-16-en-18-oic acid-(2-O-α-L-rhamnopyranosyl-β-D-glucopyranosyl) ester; 13-[(2-O-β-D-glucopyranosyl-β-D-glucopyranosyl)oxy]-17-oxo-kaur-15-en-18-oic acid β-D-glucopyranosyl ester; 13-[(2-O-(6-O-β-D-glucopyranosyl)-β-D-glucopyranosyl-β-D-glucopyranosyl)oxy]kaur-16-en-18-oic acid β-D-glucopyranosyl ester; 13-[(2-O-β-D-glucopyranosyl-3-O-β-D-fructofuranosyl-β-D-glucopyranosyl)oxy]kaur-16-en-18-oic acid β-D-glucopyranosyl ester; 13-[(2-O-β-D-glucopyranosyl-β-D-glucopyranosyl)oxy]kaur-16-en-18-oic acid-(6-O-β-D-xylopyranosyl-β-D-glucopyranosyl) ester; 13-[(2-O-β-D-glucopyranosyl-β-D-glucopyranosyl)oxy]kaur-16-en-18-oic acid-(4-O-(2-O-α-D-glucopyranosyl)-α-D-glucopyranosyl-β-D-glucopyranosyl) ester; 13-[(2-O-β-D-glucopyranosyl-3-O-β-D-glucopyranosyl-β-D-glucopyranosyl)oxy]kaur-16-en-18-oic acid-(2-O-6-deoxy-β-D-glucopyranosyl-β-D-glucopyranosyl) ester; 13-[(2-O-β-D-glucopyranosyl-β-D-glucopyranosyl)oxy]kaur-15-en-18-oic acid β-D-glucopyranosyl ester; 13-[(2-O-β-D-glucopyranosyl-3-O-β-D-xylopyranosyl-β-D-glucopyranosyl)oxy]kaur-16-en-18-oic acid β-D-glucopyranosyl ester; 13-[(2-O-β-D-xylopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-[(2-O-6-deoxy-β-D-glucopyranosyl-3-O-β-D-glucopyranosyl-β-D-glucopyranosyl)oxy]kaur-16-en-18-oic acid β-D-glucopyranosyl ester; 13-[(2-O-6-deoxy-β-D-glucopyranosyl-β-D-glucopyranosyl)oxy]kaur-16-en-18-oic acid β-D-glucopyranosyl ester; and mixtures thereof.

The sweetness enhancer may be combined with any suitable sweetener, such as natural and/or non-natural and/or synthetic sweeteners, to provide a sweetener composition having enhanced sweetness. The sweetness enhancer, however, is different from the sweetener.

Another aspect of the disclosure is a method for enhancing sweetness by combining at least one sweetener with at least one sweetness enhancer chosen from terpenes (such as sesquiterpenes, diterpenes, and triterpenes), flavonoids, amino acids, proteins, polyols, other known natural sweeteners (such as cinnamaldehydes, selligueians, hematoxylins), secodammarane glycosides, and analogues thereof in an amount at or below the sweetness detection threshold level of the at least one sweetness enhancer.

A further aspect of the disclosure is a sweetened composition comprising a sweetenable composition, a carbohydrate sweetener or a synthetic sweetener, and at least one natural sweetness enhancer chosen from at least one natural sweetness enhancer chosen from rubusoside; 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester; 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester; Rebaudioside C; Rebaudioside D; Rebaudioside F; and 13-[(2-O-β-D-glucopyranosyl-3-O-β-D-glucopyranosyl-β-D-glucopyranosyl)oxy]kaur-15-en-18-oic acid β-D-glucopyranosyl ester, wherein the at least one sweetness enhancer is present in the sweetened composition in an amount at or below the sweetness detection threshold level of the sweetness enhancer and the at least one sweetener and the at least one sweetness enhancer are different. The disclosure is also directed to a method for increasing the sweetness of a carbohydrate sweetener or a synthetic high potency sweetener in a sweetenable composition comprising: adding to the sweetenable composition at least one natural sweetness enhancer chosen from rubusoside; 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester; 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester; Rebaudioside C; Rebaudioside D; Rebaudioside F; and 13-[(2-O-β-D-glucopyranosyl-3-O-β-D-glucopyranosyl-β-D-glucopyranosyl)oxy]kaur-15-en-18-oic acid β-D-glucopyranosyl ester, wherein the sweetness enhancer is present in the sweetenable composition in an amount at or below the sweetness detection threshold level of the sweetness enhancer and the sweetener and the sweetness enhancer are different.

Other aspects of the disclosure include ingestible compositions (sweetened compositions), such as beverage compositions and table-top sweeteners, comprising compositions of the disclosure.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure.

Reference will now be made in detail to the present embodiments and exemplary embodiments of the disclosure.

DESCRIPTION

The disclosure provides a sweetener composition comprising at least one sweetener and at least one sweetness enhancer. The disclosure also provides for a sweetened composition comprising a sweetenable composition (e.g., food or beverage), at least one sweetener, and at least one sweetness enhancer. The at least one sweetness enhancer is chosen from terpenes (such as sesquiterpenes, diterpenes, and triterpenes), flavonoids, amino acids, proteins, polyols, other known natural sweeteners (such as cinnamaldehydes, selligueains, such as selligueain A and selligueain B, and hematoxylins), secodammarane glycosides, and analogues thereof. In at least one embodiment, the at least one sweetness enhancer is present in the composition in an amount at or below the sweetness detection threshold level of the at least one sweetness enhancer, and the sweetener and the sweetness enhancer are different.

As used herein, the term "sweetness enhancer" is understood to include at least compositions capable of enhancing or intensifying the perception of sweet taste of sweetener compositions or sweetened compositions. The term "sweetness enhancer" is synonymous with the terms "sweet taste potentiator," "sweetness potentiator," "sweetness amplifier," and "sweetness intensifier." Generally, the sweetness enhancers provided herein may enhance or potentiate the sweet taste of sweeteners without providing any noticeable sweet taste by themselves at acceptable use levels; however, the sweetness enhancers may themselves provide sweet taste at concentrations above a sweetness threshold level. As used herein, the term "sweetness detection threshold level" is understood to include at least the concentration at which the sweetness or off-taste of an entity is perceptible. The sweetness threshold level varies for different entities, and may be varied with respect to the individual perceiving the sweetness.

Generally, the method of measuring sweetness may comprise taking a sip (~2.2 mL from a ca. 1 oz or ca. 30 mL sample) of a control sample into the mouth and swallowing it, waiting from 15 to 25 seconds, and then taking a second sip of the control and swallowing it, and perceiving the taste. Thereafter, those steps are repeated with an experimental sample, and the sweetness can be compared to the control sample. Those steps may, for example, be repeated.

Sweetness Enhancers

The compositions of the disclosure comprise at least one sweetness enhancer. In one embodiment, the at least one sweetness enhancer is chosen from terpenes (such as sesquiterpenes, diterpenes, and triterpenes), flavonoids, amino acids, proteins, polyols, other known natural sweeteners (such as cinnamaldehydes, selligueains and hematoxylins), secodammarane glycosides, and analogues thereof.

In some embodiments, the at least one sweetness enhancer may be, but is not limited to, stevia sweeteners, such as stevioside, steviolbioside, rebaudioside A, rebaudioside B, rebaudioside C, rebaudioside D, rebaudioside F, dulcoside A, rubusoside; hernandulcin; pine rosin diperpenoid; mukurozioside; baiyunosdie; phlomisoside, such as phlomisoside I and phlomisodie II; glycyrrhizic acid; periandrins, such as periandrin I, periandrin II, periandrin III, and periandrin IV; osladin; polypodosides, such as polypodoside A and polypodoside B; mogrosides, such as mogroside IV and mogroside V; abrusoside A and abrusosdie B; cyclocariosdies, such as cyclocarioside A and cyclocarioside B; pterocaryoside A and pterocaryoside B; flavonoids, such as phyllodulcin, phloridzin, neoastilbin, and dihydroquercetin acetate; amino acids, such as glycine and monatin; proteins, such as thaumatins (thaumatin I, thaumatin II, thaumatin iii, and thaumatin IV), monellin, mabinlins (mabinlin I and mabinlin II), brazzein, miraculin, and curculin; polyols such as erythritol; cinnamaldehyde; selligueains, such as selligueain A and selligueain B; and hematoxylin.

For example, the at least one sweetness enhancer is chosen from pine rosin diterpenoids; phloridizin; neoastilbin; dihydroquercetin acetate; glycine; erythritol; cinnamaldehyde; selligueain A; selligueain B; hematoxylin; rebaudioside A; rebaudioside B; rebaudioside C; rebaudioside D; rebaudioside E; dulcoside A; steviolbioside; rubusoside; stevia; stevioside; steviol 13 O-β-D-glycoside; mogroside V; Luo Han Guo; siamenoside; siamenoside I; monatin and salts thereof (monatin SS, RR, RS, SR); curculin; glycyrrhizic acid and its salts; thaumatin I; thaumatin II; thaumatin III; thaumatin IV; monellin; mabinlin I; mabinlin II; brazzein; hernandulcin; phyllodulcin; glycyphyllin; phloridzin; trilobtain; baiyunoside; osladin; polypodoside A; polypodoside B; pterocaryoside A; pterocaryoside B; mukurozioside; mukurozioside IIb; phlomisoside I; phlomisoside II; periandrin I; periandrin II; periandrin III; periandrin VI; periandrin V; cyclocarioside A; cyclocarioside B; suavioside A; suavioside B; suavioside G; suavioside H; suavioside I; suavioside J; labdane glycosides; baiyunoside; gaudichaudioside A; mogroside IV; iso-mogroside; bryodulcoside; bryobioside; bryoside; bryonoside; carnosifloside V; carnosifloside VI; scandenoside R6; 11-oxomogroside V; abrusoside A; abrusoside B; abrusoside C; abrusoside D; abrusoside E; gypenoside XX; glycyrrhizin; apioglycyrrhizin; araboglycyrrhizin; pentadin; perillaldehyde; rebaudioside F; steviol; 13-[(2-O-β-D-glucopyranosyl-3-O-β-D-glucopyranosyl-β-D-glucopyra-nosyl)oxy]kaur-16-en-18-oic acid-(2-O-α-L rhamnopyranosyl-β-D-glucopyranosyl) ester; 13-[(2-O-β-D-glucopyranosyl-3-O-(4-O-α-D-glucopyranosyl)-β-D-glucopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-hydroxy-kaur-16-en-18-oic acid β-D-glucopyranosyl ester; 13-methyl-16-oxo-17-norkauran-18-oic acid β-D-glucopyranosyl ester; 13-[(2-O-β-D-glucopyranosyl-3-O-β-D-glucopyranosyl-β-D-glucopyranosyl)oxy]kaur-15-en-18-oic acid β-D-glucopyranosyl ester; 13-[(2-O-β-D-glucopyranosyl-3-O-β-D-glucopyranosyl-β-D-glucopyranosyl)oxy]kaur-15-en-18-oic acid; 13-[(2-O—[1-D-glucopyranosyl-3-O-β-D-glucopyranosyl]-β-D-glucopyranosyl)oxy]-17-hydroxy-kaur-15-en-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid β-D-glucopyranosyl ester; 13-[(2-O-β-D-glucopyranosyl-3-O-β-D-glucopyranosyl-β-D-glucopyranosyl)oxy]-16-hydroxy kauran-18-oic acid; isosteviol; mogroside IA; mogroside IE; mogroside II-A, mogroside II-E; mogroside III; mogroside V; isomogroside V; 11-Oxomogroside; mogrol; 11-oxomogrol; 11-oxomogroside IA; 1-[13-hydroxykaur-16-en-18-oate]β-D-glucopyranuronic acid; 13-[(2-O-β-D-glucopyranosyl-β-D-glucopyranosyl)oxy]-17-hydroxy-kaur-15-en-18-oic acid β-D-glucopyranosyl ester; 13-[(2-O-β-D-glucopyranosyl-β-D-glucopyranosyl)oxy]kaur-16-en-18-oic acid-(2-O-β-D-glucopyranosyl-β-D-glucopyranosyl)ester (rebaudioside E); 13-[(2-O-α-L-rhamnopyranosyl-3-O-β-D-glucopyranosyl-β-D-glucopyranosyl)oxy]kaur-16-en-18-oic acid-(2-O-β-D-glucopyranosyl-β-D-glucopyranosyl) ester; 13-[(2-O-β-D-glucopyranosyl-β-D-glucopyranosyl)oxy]-17-oxo-kaur-15-en-18-oic acid β-D-glucopyranosyl ester; 13-[(2-O-β-D-glucopyranosyl-β-D-glucopyranosyl)oxy]-17-oxo-kaur-15-en-18-oic acid β-D-glucopyranosyl ester; 13-[(2-O-(6-O-β-D-glucopyranosyl)-β-D-glucopyranosyl-β-D-glucopyranosyl)oxy]kaur-16-en-18-oic acid β-D-glucopyranosyl ester; 13-[(2-O-β-D-glucopyranosyl-3-O-β-D-fructofuranosyl-β-D-glucopyranosyl)oxy]kaur-16-en-18-oic acid β-D-glucopyranosyl ester; 13-[(2-O-β-D-glucopyranosyl-β-D-glucopyranosyl)oxy]kaur-16-en-18-oic acid-(6-O-β-D-xylopyranosyl-β-D-glucopyranosyl) ester; 13-[(2-O-β-D-glucopyranosyl-β-D-glucopyranosyl)oxy] kaur-16-en-18-oic acid-(4-O-(2-O-α-D-glucopyranosyl)-α-D-glucopyranosyl-β-D-glucopyranosyl) ester; 13-[(2-O-β-D-glucopyranosyl-3-O-β-D-glucopyranosyl-β-D-glucopyranosyl)oxy]kaur-16-en-18-oic acid-(2-O-6-deoxy-β-D-glucopyranosyl-β-D-glucopyranosyl) ester; 13-[(2-O-β-D-glucopyranosyl-β-D-glucopyranosyl)oxy]kaur-15-en-18-oic acid β-D-glucopyranosyl ester; 13-[(2-O-β-D-glucopyranosyl-3-O-β-D-xylopyranosyl-β-D-glucopyranosyl)oxy]kaur-16-en-18-oic acid β-D-glucopyranosyl ester; 13-[(2-O-β-D-xylopyranosyl-β-D-glucopyranosyl)oxy]kaur-16-en-18-oic acid β-D-glucopyranosyl ester; 13-[(3-O-β-D-glucopyranosyl-β-D-glucopyranosyl)oxy]kaur-16-en-18-oic acid β-D-glucopyranosyl ester; 13-[(2-O-6-deoxy-β-D-glucopyranosyl-3-O-β-D-glucopyranosyl-β-D-glucopyranosyl)oxy]kaur-16-en-18-oic acid β-D-glucopyranosyl ester; 13-[(2-O-6-deoxy-β-D-glucopyranosyl-β-D-glucopyranosyl)oxy]kaur-16-en-18-oic acid β-D-glucopyranosyl ester; and mixtures thereof.

In further embodiments, the at least one sweetness enhancer may comprise a combination of sweetness enhancers. For example, the combination of rubusoside and at least one of 13-[(2-O-β-D-glucopyranosyl-3-O-β-D-glucopyranosyl-β-D-glucopyranosyl)oxy]kaur-15-en-18-oic acid β-D-glucopyranosyl ester, rebaudioside C or 13-[(2-O-(3-O-α-D-glucopyranosyl)-β-D-glucopyranosyl-3-O-β-D-glucopyranosyl-β-D-glucopyranosyl)oxy]kaur-16-en-18-oic acid□β-D-glucopyranosyl ester, at least one of rubusoside, rebaudioside C, 13-[(2-O-β-D-glucopyranosyl-3-O-β-D-glucopyranosyl-β-D-glucopyranosyl)oxy]kaur-15-en-18-oic acid β-D-glucopyranosyl ester, or 13-[(2-O-(3-O-α-D-glucopyranosyl)-β-D-glucopyranosyl-3-O-β-D-glucopyranosyl-β-D-glucopyranosyl)oxy]kaur-16-en-18-oic acid□β-D-glucopyranosyl ester and at least one of isomogroside, mogroside V, or mogroside IV, or at least one of rubusoside, rebaudioside C, 13-[(2-O-β-D-glucopyranosyl-3-O-β-D-glucopyranosyl-β-D-glucopyranosyl)oxy]kaur-15-en-18-oic acid β-D-glucopyranosyl ester, or 13-[(2-O-(3-O-α-D-glucopyranosyl)-β-D-glucopyranosyl-3-O-β-D-glucopyranosyl-β-D-glucopyranosyl)oxy]kaur-16-en-18-oic acid□β-D-glucopyranosyl ester and glycyrrhizic acid, or at least one of rubusoside, rebaudioside C, 13-[(2-O-β-D-glucopyranosyl-3-O-β-D-glucopyranosyl-β-D-glucopyranosyl)oxy]kaur-15-en-18-oic acid β-D-glucopyranosyl ester, 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester, isomogroside, mogroside V or mogroside IV, synthetic sucrose enhancer, synthetic enhancer and any carbohydrate enhancers.

In some embodiments, the at least one sweetness enhancer is chosen from 13-[(2-O-β-D-glucopyranosyl-3-O-β-D-glucopyranosyl-β-D-glucopyranosyl)oxy]kaur-15-en-18-oic acid β-D-glucopyranosyl ester. This compound may be found in stevia leaf extract and can also be a degradation product of rebaudioside A. In some embodiments, the at least one sweetness enhancer is chosen from rebaudioside C, rebaudioside F, rebaudioside D, 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester, 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester, and Rubusoside. Further for example, the at least one sweetness enhancer is chosen from rebaudioside A, stevioside, rebaudioside D, rebaudioside E, mogroside V, mogroside IV, brazzein, and monatin.

As mentioned above, the at least one sweetness enhancer may, for example, impart a sweetness or taste at certain concentrations and no perceptible sweetness or taste at other concentrations. For example, the at least one sweetness enhancer may be present in an amount such that the taste, such as sweetness, of the at least one sweetness enhancer is imperceptible. The sweetener composition discussed herein includes an effective amount of the at least one sweetness enhancer in the sweetener composition. An effective amount of the at least one sweetness enhancer includes an amount sufficient to increase or enhance the sweetness intensity of the at least one sweetener without the at least one sweetness enhancer.

In at least one embodiment, the at least one sweetness enhancer is present in an amount at or below the sweetness detection threshold level of the at least one sweetness enhancer. In some embodiments, the at least one sweetness enhancer is present in an amount below the sweetness detection threshold level of the at least one sweetness enhancer.

The sweetness detection threshold level can be specific for a particular compound. However, generally, in some embodiments, the at least one sweetness enhancer is present in an amount ranging from 0.5 ppm to 1000 ppm. For example, the at least one sweetness enhancer may be present in an amount ranging from 1 ppm to 300 ppm; and at least one sweetness enhancer may be present in an amount ranging from 0.1 ppm to 75 ppm; and at least one sweetness enhancer may be present in an amount ranging from 500 ppm to 3,000 ppm.

As used herein, the terms "sweetness threshold," "sweetness recognition threshold," and "sweetness detection threshold" are understood to mean the level at which the lowest known concentration of a certain sweet compound that is perceivable by the human sense of taste and it can vary from person to person. For example, a typical sweetness threshold level for sucrose in water can be 0.5%.

Further for example, the at least one sweetness enhancer to be used can be assayed in water at least 25% lower and at least 25% higher than the sucrose detection level of 0.5% in water to determine the sweetness threshold level.

A person of skill in the art will be able to select the concentration of the at least one sweetness enhancer so that it may impart an enhanced sweetness to a composition comprising at least one sweetener. For example, a skilled artisan may select a concentration for the at least one sweetness enhancer so that the at least one sweetness enhancer does not impart any perceptible sweetness to a composition that does not comprise at least one sweetener.

In at least one embodiment, the sweetness enhancer is Rebaudioside A (REB A). In this embodiment, Rebaudioside A may, for example, be present in the composition in an amount less than or equal to 13 ppm. In at least one embodiment, Rebaudioside A is present in an amount less than 13 ppm, for example less than 10 ppm, or for example less than 5 ppm.

In some embodiments, the at least one sweetness enhancer is stevioside, rebaudioside B (REB B), rebaudioside F (REB F), rebaudioside D (REB D), or 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester. In these embodiments, for example, the at least one sweetness enhancer may be present in the composition in an amount less than or equal to 25 ppm, such as less than 25 ppm, for example less than 20 ppm, or for example less than 15 ppm, or less than 20 ppm.

In some embodiments, the sweetness enhancer is steviolbioside, 13-[(2-O-β-D-glucopyranosyl-3-O-(4-O-α-D-glucopyranosyl)-β-D-glucopyranosyl-β-D-glucopyranosyl)oxy]kaur-16-en-18-oic acid β-D-glucopyranosyl ester, dulcoside A, or rubusoside. In these embodiments, the at least one sweetness enhancer may, for example, be present in an amount less than or equal to 50 ppm, such as less than 50 ppm, for example less than 45 ppm, or for example less than 40 ppm or less than 35 ppm, or less than 30 ppm. The sweetness thresholds of sweetness enhancers can be varied based on different matrix systems, such as 50 ppm rubusoside in water as shown in Example 1 versus 150 ppm rubusoside in flavored lemon-lime, citric buffer and carbonated water as shown in Example 4. The citric buffer includes citric acid and citrate salt. Other matrix systems include phosphoric acid and any other acidulants, in any pHs ranging from 1.8 to 8.5 and in any temperatures ranging from 0° C. to 50° C.

In at least one embodiment, the at least one sweetness enhancer is 13-[(2-O-β-D-glucopyranosyl-3-O-β-D-glucopyranosyl-β-D-glucopyranosyl)oxy]-16-hydroxy kauran-18-oic acid β-D-glucopyranosyl ester. In this embodiment, 13-[(2-O-β-D-glucopyranosyl-3-O-β-D-glucopyranosyl-β-D-glucopyranosyl)oxy]-16-hydroxy kauran-18-oic acid β-D-glucopyranosyl ester may, for example, be present in the composition in an amount less than or equal to 700 ppm, such as less than 700 ppm, for example less than 600 ppm, such as less than 500 ppm.

In at least one embodiment, the at least one sweetness enhancer is 13-[(2-O-β-D-glucopyranosyl-3-O-β-D-glucopyranosyl-β-D-glucopyranosyl)oxy]-16-hydroxy kauran-18-oic acid. In this embodiment, 13-[(2-O-β-D-glucopyranosyl-3-O-β-D-glucopyranosyl-β-D-glucopyranosyl)oxy]-16-hydroxy kauran-18-oic acid may, for example, be present in the composition in an amount less than or equal to 500 ppm, such less than 500 ppm, for example less than 400 ppm or less than 300 ppm.

In at least one embodiment, the at least one sweetness enhancer is 13-[(2-O-β-D-glucopyranosyl-3-O-β-D-glucopyranosyl-β-D-glucopyranosyl)oxy]kaur-15-en-18-oic acid or 13-[(3-O-β-D-glucopyranosyl-β-D-glucopyranosyl)oxy]kaur-16-en-18-oic acid β-D-glucopyranosyl ester. In these embodiments, the at least one sweetness enhancer may, for example, be present in the composition in an amount less than or equal to 35 ppm, such less than 35 ppm, for example less than 30 ppm or less than 25 ppm.

In at least one embodiment, the at least one sweetness enhancer is 13-methyl-16-oxo-17-norkauran-18-oic acid β-D-glucopyranosyl ester. In this embodiment, 13-methyl-16-oxo-17-norkauran-18-oic acid β-D-glucopyranosyl ester may, for example, be present in the composition in an amount less than or equal to 15 ppm, such less than 15 ppm, for example less than 12 ppm or less than 10 ppm.

In at least one embodiment, the at least one sweetness enhancer is Steviol glucuronide. In this embodiment, Steviol glucuronide may, for example, be present in the composition in an amount less than or equal to 85 ppm, such less than 85 ppm, for example less than 80 ppm or less than 70 ppm or less than 60 ppm.

In at least one embodiment, the at least one sweetness enhancer is Rebaudioside C (REB C). In this embodiment, Rebaudioside C may, for example, be present in the composition in an amount less than or equal to 100 ppm, such less than 100 ppm, for example less than 90 ppm or less than 80 ppm or less than 70 ppm.

In at least one embodiment, the at least one sweetness enhancer is 13-[(2-O-β-D-glucopyranosyl-3-O-β-D-glucopyranosyl]-β-D-glucopyranosyl)oxy]-17-hydroxy-kaur-15-en-18-oic acid 3-D-glucopyranosyl ester. In this embodiment, 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester may, for example, be present in the composition in an amount less than or equal to 250 ppm, such less than 250 ppm, for example less than 200 ppm or less than 150 ppm or less than 100 ppm.

In at least one embodiment, the at least one sweetness enhancer is 13-hydroxy-kaur-16-en-18-oic acid β-D-glucopyranosyl ester. In this embodiment, 13-hydroxy-kaur-16-en-18-oic acid β-D-glucopyranosyl ester may, for example, be present in the composition in an amount less than or equal to 10 ppm, such less than 10 ppm, for example less than 9 ppm or less than 8 ppm or less than 7 ppm.

In at least one embodiment, the at least one sweetness enhancer is Mogroside V. In this embodiment, Mogroside V may, for example, be present in the composition in an amount less than or equal to 20 ppm, such less than 20 ppm, for example less than 18 ppm or less than 15 ppm or less than 10 ppm.

Sweeteners

The sweetness enhancers described above may be used to enhance the sweet taste or perception of any suitable natural or synthetic sweetener, such as any suitable caloric, low-caloric or non-caloric sweetener. The sweetness enhancer and the sweetener are different. Although an ingredient may be characterized as both a sweetness enhancer and a sweetener, in compositions of the disclosure, the sweetness enhancer and the sweetener are different ingredients, i.e., the enhancer and the sweetener are not the same ingredient. Non-limiting examples of such sweeteners include caloric carbohydrate sweeteners, natural carbohydrate sweeteners, non-natural carbohydrate sweeteners, natural high-potency sweeteners, non-natural high-potency sweeteners, synthetic high potency sweeteners, synthetic carbohydrate sweeteners, and combinations thereof. As used herein, the phrase "sweetness enhanced sweetener composition" refers to combinations including at least one sweetness enhancer and at least one sweetener.

Accordingly, the compositions of the disclosure comprise at least one sweetener. The at least one sweetener may be any type of sweetener, for example a natural, non-natural, or synthetic sweetener. In at least one embodiment, the at least one sweetener is chosen from natural sweeteners. In another embodiment, the at least one sweetener is chosen from synthetic sweeteners. In another embodiment, the at least one sweetener is chosen from non-natural sweeteners.

For example, the at least one sweetener may be a caloric carbohydrate sweetener. Non-limiting examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS) (e.g., HFCS55, HFCS42, or HFCS90), coupling sugars, soybean oligosaccharides, glucose syrup, and mixtures thereof.

In at least one embodiment, the at least one natural sweetener is chosen from glucose, fructose, sucrose, and mixtures thereof.

In some embodiments, the at least one sweetener is selected from carbohydrate sweeteners.

In at least one embodiment, the at least one sweetener is chosen from sucrose, fructose, glucose, erythritol, high fructose corn syrup, and mixtures thereof.

For example, the at least one sweetener may be a synthetic sweetener. As used herein, the phrase "synthetic sweetener" refers to any composition which is not found naturally in nature and characteristically has a sweetness potency greater than sucrose, fructose, or glucose, yet have less calories. Non-limiting examples of synthetic sweeteners suitable for embodiments of this disclosure include sucralose, potassium acesulfame, aspartame, alitame, saccharin, neohesperidin dihydrochalcone, cyclamate, neotame, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like.

In at least one embodiment, the at least one synthetic sweetener is chosen from sucralose, aspartame, potassium acesulfame, and mixtures thereof.

Other sweeteners suitable for use in embodiments provided herein, for example, include natural and synthetic high-potency sweeteners. As used herein the phrases "natural high-potency sweetener", "NHPS", "NHPS composition", and "natural high-potency sweetener composition" are synonymous. "NHPS" means any sweetener found in nature which may be in raw, extracted, purified, or any other form, singularly or in combination thereof and characteristically have a sweetness potency greater than sucrose, fructose, or glucose, yet have less calories. Non-limiting examples of NHPSs suitable for embodiments of this disclosure include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I. NHPS also includes modified NHPSs. Modified NHPSs include NHPSs which have been altered naturally. For example, a modified NHPS includes, but is not limited to, NHPSs which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPSs may be substituted for a NHPS or may be used in combination with NHPSs for any of the embodiments described herein. For the sake of brevity, however, in the description of embodiments, a modified NHPS is not expressly described as an alternative to an unmodified NHPS, but it should be understood that modified NHPSs can be substituted for NHPSs in any embodiment disclosed herein.

For example, the at least one sweetener may be used individually or in combination with other sweeteners. For example, the sweetener composition may comprise a single NHPS or a single synthetic sweetener; a single NHPS in combination with a single synthetic sweetener; one or more NHPSs in combination with a single synthetic sweetener; a single NHPS in combination with one or more synthetic sweeteners; or one or more NHPSs in combination with one or more synthetic sweeteners. A plurality of natural and/or synthetic sweeteners may be used as long as the combined effect does not adversely affect the taste of the sweetener composition or orally sweetened composition.

In addition, those of ordinary skill in the art should appreciate that the sweetener composition can be customized to obtain a desired calorie content. For example, a low-caloric or non-caloric synthetic sweetener may be combined with a caloric sweetener and/or other caloric additives to produce a sweetener composition with a preferred calorie content.

The term "polyol", as used herein, refers to a molecule that contains more than one hydroxyl group. A polyol may be a diol, triol, or a tetraol which contains 2, 3, and 4 hydroxyl groups respectively. A polyol also may contain more than four hydroxyl groups, such as a pentaol, hexaol, heptaol, or the like, which contain, 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect the taste of the synthetic sweetener or the orally ingestible composition.

The at least one sweetener is present in the composition in an amount greater than its sweetness threshold level. In some embodiments, the at least one sweetener may be present in an amount ranging from 0.01% to 99% by weight, relative to the total weight of the composition. For example, the at least one sweetener may be present in an amount ranging from 2% to 50%, or for example from 4% to 50% by weight, relative to the total weight of the composition.

In accordance with the disclosure, the at least one sweetness enhancer may potentiate or enhance the sweetness of the at least one sweetener. In at least one embodiment, the composition comprising at least one sweetener and at least one sweetness enhancer has more sweetness intensity than a composition comprising the at least one sweetener without the at least one sweetness enhancer.

As used herein, the term "sweetness intensity" is understood to mean any perceptible sweetness. For example, a composition of the disclosure may be slightly more sweet than a composition comprising the at least one sweetener without the at least one sweetness enhancer. In at least one embodiment, the composition of the disclosure is perceptibly more sweet than a composition comprising the at least one sweetener without the at least one sweetness enhancer.

In some embodiments, the sweetness intensity increases by greater than 0.5%, such as 1%, 2%, 3%, 4% or 5%, relative to the sweetness of the composition comprising the at least one sweetener without the at least one sweetness enhancer, as measure by sucrose equivalent. For example, the sweetness intensity may increase by greater than 10% or by greater than 20% relative to the sweetness of a composition comprising the at least one sweetener without the at least one sweetness enhancer, as measured by sucrose equivalent.

It is contemplated that the combination of at least one sweetness enhancer and at least one sweetener may be carried out in any pH range that does not materially or adversely affect the taste of the sweetener composition or the sweetened composition. A non-limiting example of the pH range may be from about 1.8 to about 9. A further example includes a pH range from about 2 to about 5. The temperature of the composition may, for example, range from 4° C. to 25° C.

One of ordinary skill in the art may combine the at least one sweetener, for example at least two sweeteners or at least three sweeteners, and at least one sweetness enhancer, for example at least two or at least three sweetness enhancers, in any manner.

In at least one embodiment, the composition of the disclosure comprises at least one additional additive, such as a sweet taste improving composition, and/or a sweet taste improving additive.

For example, the composition of the disclosure may comprise at least one sweet taste improving composition for re-balancing the temporal and/or flavor profile of the sweetness enhanced sweetener composition. The use of sweet taste improving compositions to improve the temporal and/or flavor profile of sweetener compositions are described in detail in co-pending U.S. patent application Ser. Nos. 11/561,148, 11/561,158, and U.S. Patent Application Publication No. 2008/0292765, the disclosures of which are incorporated herein by reference in their entirety.

For example, suitable sweet-taste improving compositions include, but are not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, flavonoids, alcohols, polymers, other sweet taste improving taste additives imparting such sugar-like characteristics, and combinations thereof.

As used herein, the phrase "sweet taste improving additive" means any material that imparts a more sugar-like temporal profile or sugar-like flavor profile or both to a synthetic sweetener. Suitable sweet taste improving additives useful in embodiments of this disclosure include amino acids and salts thereof, poly-amino acids and salts thereof, peptides, sugar acids and salts thereof, nucleotides and salts thereof, organic acids, inorganic acids, organic salts including organic acid salts and organic base salts, inorganic acid salts (e.g., sodium chloride, potassium chloride, magnesium chloride), acid salts (e.g., sodium citrate), bitter compounds, flavorants and flavoring ingredients, astringent compounds, polymers, proteins or protein hydrolysates, surfactants, emulsifiers, flavonoids, alcohols, and natural high-potency sweeteners.

Suitable sweet taste improving amino acid additives for use in embodiments of this disclosure include, but are not limited to, aspartic acid, arginine, glycine, glutamic acid, proline, threonine, theanine, cysteine, cystine, alanine, valine, tyrosine, leucine, isoleucine, asparagine, serine, lysine, histidine, ornithine, methionine, carnitine, aminobutyric acid ($\alpha$-, $\beta$-, or $\gamma$-isomers), glutamine, hydroxyproline, taurine, norvaline, sarcosine, and their salt forms such as sodium or potassium salts or acid salts. The sweet taste improving amino acid additives also may be in the D- or L-configuration and in the mono-, di-, or tri-form of the same or different amino acids. Additionally, the amino acids may be $\alpha$-, $\beta$-, $\gamma$-, $\delta$-, and $\epsilon$-isomers if appropriate. Combinations of the foregoing amino acids and their corresponding salts (e.g., sodium, potassium, calcium, magnesium salts or other alkali or alkaline earth metal salts thereof, or acid salts) also are suitable sweet taste improving additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable sweet taste improving polyamino acid additives include poly-L-aspartic acid, poly-L-lysine (e.g., poly-L-$\alpha$-lysine or poly-L-$\epsilon$-lysine), poly-L-ornithine (e.g., poly-L-$\alpha$-ornithine or poly-L-$\epsilon$-ornithine), poly-L-arginine, other polymeric forms of amino acids, and salt forms thereof (e.g., calcium, potassium, sodium, or magnesium salts such as L-glutamic acid mono sodium salt). The sweet taste improving poly-amino acid additives also may be in the D- or L-configuration. Additionally, the poly-amino acids may be $\alpha$-, $\beta$-, $\gamma$-, $\delta$-, and $\epsilon$-isomers if appropriate. Combinations of the foregoing poly-amino acids and their corresponding salts (e.g., sodium, potassium, calcium, magnesium salts or other alkali or alkaline earth metal salts thereof or acid salts) also are suitable sweet taste improving additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to poly-amino acids of various molecular weights (MW), such as poly-L-$\alpha$-lysine with a MW of 1,500, MW of 6,000, MW of 25,200, MW of 63,000, MW of 83,000, or MW of 300,000.

Suitable sweet taste improving sugar acid additives include, for example, but are not limited to aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

For example, suitable sweet taste improving nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable sweet taste improving organic acid additives include any compound which comprises a—COOH moiety. Suitable sweet taste improving organic acid additives, for example, include but are not limited to C2-C30 carboxylic acids, substituted hydroxyl C2-C30 carboxylic acids, benzoic acid, substituted benzoic acids (e.g., 2,4-dihydroxybenzoic acid), substituted cinnamic acids, hydroxyacids, substituted hydroxybenzoic acids, substituted cyclohexyl carboxylic acids, tannic acid, lactic acid, tartaric acid, citric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

For example, suitable sweet taste improving organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), and adipic acid. The examples of the sweet taste improving organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phospho, phosphonato, and any other viable functional group provided the substituted organic acid additives function to improve the sweet taste of a synthetic sweetener.

For example, suitable sweet taste improving inorganic acid additives include but are not limited to phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

Suitable sweet taste improving bitter compound additives, for example, include but are not limited to caffeine, quinine, urea, bitter orange oil, naringin, quassia, and salts thereof.

In at least one embodiment, the at least one sweetener may be combined with at least one sweetness enhancer prior to being added to an orally ingestible composition or a sweetenable composition to generate a sweetened composition. For example, the at least one sweetener may be in a pure, diluted, or concentrated form as a liquid (e.g., solution), solid (e.g., powder, chunk, pellet, grain, block, crystalline, or the like), suspension, gas state, or combinations thereof may be contacted with the at least one sweet taste improving composition which may be in a pure, diluted, or concentrated form as a liquid (e.g., solution), solid (e.g., powder, chunk, pellet, grain, block, crystalline, or the like), suspension, gas state, or combinations thereof and with the at least one sweetness enhancer which may be in pure, diluted, or concentrated form as a liquid (e.g., solution), solid (e.g., powder, chunk, pellet grain, block, crystalline, or the like), suspension, gas state, or combinations thereof before all are contacted with an orally ingestible composition. In yet another embodiment, when there are more than one sweetener or more than one sweetness enhancer, each component of the sweetener composition may be added simultaneously, in an alternating pattern, in a random pattern, or any other pattern.

As used herein, "orally ingestible composition" and "sweetenable composition" are synonymous and mean substances which are contacted with the mouth of man or animal, including substances which are taken into and subsequently ejected from the mouth and substances which are drunk, eaten, swallowed or otherwise ingested, and are safe for human or animal consumption when used in a generally acceptable range. These compositions include, for example, food, beverage, pharmaceutical, tobacco, nutraceutical, oral hygienic/cosmetic products, and the like. Non-limiting examples of these products include non-carbonated and carbonated beverages such as colas, ginger ales, root beers, ciders, fruit-flavored soft drinks (e.g., citrus-flavored soft drinks such as lemon-lime or orange), powdered soft drinks, and the like; fruit juices originating in fruits or vegetables, fruit juices including squeezed juices or the like, fruit juices containing fruit particles, fruit beverages, fruit juice beverages, beverages containing fruit juices, beverages with fruit flavorings, vegetable juices, juices containing vegetables, and mixed juices containing fruits and vegetables; sport drinks, energy drinks, near water and the like drinks (e.g., water with natural or synthetic flavorants); tea type or favorite type beverages such as coffee, cocoa, black tea, green tea, oolong tea and the like; beverages containing milk components such as milk beverages, coffee containing milk components, cafe au lait, milk tea, fruit milk beverages, drinkable yogurt, lactic acid bacteria beverages or the like; dairy products; bakery products; desserts such as yogurt, jellies, drinkable jellies, puddings, Bavarian cream, blancmange, cakes, brownies, mousse and the like, sweetened food products eaten at tea time or following meals; frozen foods; cold confections, e.g. types of ice cream such as ice cream, ice milk, lacto-ice and the like (food products in which sweeteners and various other types of raw materials are added to milk products, and the resulting mixture is agitated and frozen), and ice confections such as sherbets, dessert ices and the like (food products in which various other types of raw materials are added to a sugary liquid, and the resulting mixture is agitated and frozen); ice cream; general confections, e.g., baked confections or steamed confections such as cakes, crackers, biscuits, buns with bean-jam filling and the like; rice cakes and snacks; table top products; general sugar confections such as chewing gum (e.g., including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans and the like; sauces including fruit flavored sauces, chocolate sauces and the like; edible gels; crèmes including butter crèmes, flour pastes, whipped cream and the like; jams including strawberry jam, marmalade and the like; breads including sweet breads and the like or other starch products; spice; general condiments including seasoned soy sauce used on roasted meats, roast fowl, barbecued meat and the like, as well as tomato catsup, sauces, noodle broth and the like; processed agricultural products, livestock products or seafood; processed meat products such as sausage and the like; retort food products, pickles, preserves boiled in soy sauce, delicacies, side dishes; snacks such as potato chips, cookies, or the like; cereal products; drugs or quasi-drugs that are administered orally or used in the oral cavity (e.g., vitamins, cough syrups, cough drops, chewable medicine tablets, amino acids, bitter-tasting drug or pharmaceutical agents, acidulants or the like), wherein the drug may be in solid, liquid, gel, or gas form such as a pill, tablet, spray, capsule, syrup, drop, troche agent, powder, and the like; personal care products such as other oral compositions used in the oral cavity such as mouth freshening agents, gargling agents, mouth rinsing agents, toothpaste, tooth polish, dentifrices, mouth sprays, teeth-whitening agents and the like; dietary supplements; tobacco products including smoke and smokeless tobacco products such as snuff, cigarette, pipe and cigar tobacco, and all forms of tobacco such as shredded filler, leaf, stem, stalk, homogenized leaf cured, reconstituted binders and reconstituted tobacco from tobacco dust, fines or ether sources in sheet, pellet or other forms, tobacco substitutes formulated from non-tobacco materials, dip or chewing tobacco; animal feed; and nutraceutical products, which includes any food or part of a food that may provide medicinal or health benefits, including the prevention and treatment of disease (e.g., cardiovascular disease and high levels of cholesterol in the blood, diabetes, osteoporosis, inflammation, or autoimmune disorders).

Generally, the amount of sweetness enhanced sweetener composition present in a sweetened composition may vary widely depending on the type of sweetened composition and its desired sweetness. Those of ordinary skill in the art can readily discern the appropriate amount of sweetener to put in the sweetened composition.

In at least one embodiment, an orally ingestible composition comprises a carbonated beverage comprising at least one sweetener and at least one sweetness enhancer chosen from terpenes (such as sesquiterpenes, diterpenes, and triterpenes), flavonoids, amino acids, proteins, polyols, other known natural sweeteners, secodammarane glycosides, and analogues thereof, wherein the at least one sweetness enhancer is present in the composition in an amount at or below the sweetness detection threshold level of the at least one sweetness enhancer and the sweetener and the sweetness enhancer are different.

In some embodiments of the disclosure, the sweetener composition is in a form of a tabletop sweetener composition comprising at least one sweetener, at least one sweetness enhancer, at least one bulking agent, and optionally at least one sweet taste improving composition and/or anti-caking agent with improved temporal and/or flavor profile.

For example, suitable "bulking agents" include, but are not limited to maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and mixtures thereof. Additionally, the at least one bulking agent is chosen from, granulated sugar (sucrose) or other caloric sweeteners such as crystalline fructose, other carbohydrates, and sugar alcohols. In one embodiment, a bulking agent may be used as a sweet taste improving composition.

As used herein the phrase "anti-caking agent" is understood to mean any composition which prevents, reduces, inhibits, or suppresses at least one sweetener molecule from attaching, binding, or contacting to another sweetener molecule. Alternatively, "anti-caking agent" may refer to any composition which assists in content uniformity and uniform dissolution. In accordance with some embodiments, non-limiting examples of anti-caking agents include cream of tartar, calcium silicate, silicon dioxide, microcrystalline cellulose (Avicel, FMC BioPolymer, Philadelphia, Pa.), and tri-calcium phosphate. In at least one embodiment, the anti-caking agents are present in the tabletop sweetener composition in an amount from about 0.001 to about 3% by weight of the tabletop sweetener composition.

Tabletop sweetener compositions may be embodied and packaged in numerous different forms, and may be of any form known in the art. For example, and not by way of limitation, the tabletop sweetener compositions may be in the form of powders, granules, packets, tablets, sachets, pellets, cubes, solids, or liquids.

Another aspect of the disclosure is a method of for enhancing sweetness of a composition, comprising combining at least one sweetener and at least one sweetness enhancer chosen from terpenes (such as sesquiterpenes, diterpenes, and triterpenes), flavonoids, amino acids, proteins, polyols, other known natural sweeteners, secodammarane glycosides, and analogues thereof, wherein the at least one sweetness enhancer is present in the composition in an amount at or below the sweetness detection threshold level of the at least one sweetness enhancer and the sweetener and the sweetness enhancer are different.

Notwithstanding that the numerical ranges and parameters setting forth the broad scope of the disclosure are approximations, unless otherwise indicated the numerical values set forth in the specific examples are reported as precisely as possible. Any numerical value, however, inherently contains certain errors necessarily resulting from the standard deviation found in their respective testing measurements.

By way of non-limiting illustration, concrete examples of certain embodiments of the present disclosure are given below.

EXAMPLES

Example 1

Multi-Sip and Swallow Taste Method

A first sip (approximately 2.2 mL) of a ca. 20 mL control composition was taken and swallowed. After waiting for a time ranging from 15 to 25 seconds, a second sip of control composition was taken and swallowed, and the sweetness and/or taste of the control composition was noted. After waiting for a time ranging from 15 to 25 seconds, these steps were repeated with a comparative composition. The sweetness and taste differences between the control and the comparative composition were noted. For each tested composition, this cycle was repeated once to confirm the initial findings. All samples were measured at average 23.0° C.±1° C. between samples for consistent comparison and to minimize any effects of temperature on the perceived taste or sweetness of the composition.

Taste Test Guideline

To perform the taste test, three sweetener samples were paired with one additive and taste tested as described above. A three minute break was taken before tasting another three sweetener samples paired with a different additive. Up to 10 additives per day were used to minimize a fatigue factor. Before tasting, at least 1.5 hours elapsed after ingestion of any food, drink or nicotine. The tests were repeated on a different date to validate the initial findings.

The sweetness detection threshold levels for 21 entities were measured by a single assessor in water at room temperature according to the multi-sip and swallow taste method described herein. The sweetness detection threshold levels obtained are shown in Table 1.

TABLE 1

The sweetness detection threshold results of 21 entities.

| Compound | Sweetness Detection Threshold Level (ppm) |
|---|---|
| Rebaudioside A (REB A) | 12.6 |
| Stevioside | 25 |
| Rebaudioside B (REB B) | 25 |
| Steviolbioside | 50 |
| 13-[(2-O-β-D-glucopyranosyl-3-O-β-D-glucopyranosyl-β-D-glucopyranosyl)oxy]-16-hydroxy kauran-18-oic acid β-D-glucopyranosyl ester | 700 |
| 13-[(2-O-β-D-glucopyranosyl-3-O-β-D-glucopyranosyl-β-D-glucopyranosyl)oxy] kaur-15-en-18-oic acid β-D-glucopyranosyl ester | 25 |
| 13-[(2-O-β-D-glucopyranosyl-3-O-β-D-glucopyranosyl-β-D-glucopyranosyl)oxy]-16-hydroxy kauran-18-oic acid (max. level for solubility) | 500 |
| 13-[(2-O-β-D-glucopyranosyl-3-O-β-D-glucopyranosyl-β-D-glucopyranosyl)oxy] kaur-15-en-18-oic acid | 35 |
| 13-methyl-16-oxo-17-norkauran-18-oic acid β-D-glucopyranosyl ester (min. off-tasted threshold) | 15 |
| Dulcoside A | 50 |
| Steviol glucuronide | 85 |
| Rebaudioside C (REB C) | 100 |
| Rebaudioside F (REB F) | 25 |
| Rebaudioside D (REB D) | 25 |

TABLE 1-continued

The sweetness detection threshold results of 21 entities.

| Compound | Sweetness Detection Threshold Level (ppm) |
|---|---|
| 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester | 250 |
| 13-[(2-O-(3-O-α-D-glucopyranosyl)-β-D-glucopyranosyl-3-O-β-D-glucopyranosyl-β-D-glucopyranosyl)oxy] kaur-16-en-18-oic acid β-D-glucopyranosyl ester | 25 |
| 13-[(2-O-β-D-glucopyranosyl-3-O-(4-O-α-D-glucopyranosyl)-β-D-glucopyranosyl-β-D-glucopyranosyl)oxy] kaur-16-en-18-oic acid β-D-glucopyranosyl ester | 50 |
| 13-[(3-O-β-D-glucopyranosyl-β-D-glucopyranosyl)oxy] kaur-16-en-18-oic acid β-D-glucopyranosyl ester | 35 |
| 13-hydroxy-kaur-16-en-18-oic acid β-D-glucopyranosyl ester (min. off-taste threshold) | 10 |
| Mogroside V | 20 |
| Rubusoside | 50 |

The twenty-one entities above were combined in a concentration at the sweetness detection threshold level listed in Table 1, with one of Glucose (GLU), Fructose (FRU), and Sucrose (SUG), each at a fixed SE (Sucrose Equivalents) level of 6%. The sweetness of the compositions was measured as described above at room temperature. A summary of the results is provided in Table 2.

TABLE 2

Sensory results of 21 entities versus 3 sweeteners.

| | Sweetener at 6% SE in water | | |
|---|---|---|---|
| Additive | GLU 99,000 ppm | FRU 55,000 ppm | SUC 60,000 ppm |
| REB A | N | N | N |
| REB B | N | N | N |
| Stevioside | N | N | N |
| Steviolbioside | N | N | N |
| 13-[(2-O-β-D-glucopyranosyl-3-O-β-D-glucopyranosyl-β-D-glucopyranosyl)oxy]-16-hydroxy kauran-18-oic acid β-D-glucopyranosyl ester | N | N | N |
| 13-[(2-O-β-D-glucopyranosyl-3-O-β-D-glucopyranosyl-β-D-glucopyranosyl)oxy] kaur-15-en-18-oic acid β-D-glucopyranosyl ester | N | N(S+) | N(S+) |
| 13-[(2-O-β-D-glucopyranosyl-3-O-β-D-glucopyranosyl-β-D-glucopyranosyl)oxy]-16-hydroxy kauran-18-oic acid | N | N | N |
| 13-[(2-O-β-D-glucopyranosyl-3-O-β-D-glucopyranosyl-β-D-glucopyranosyl)oxy] kaur-15-en-18-oic acid | N | N | N |
| 13-methyl-16-oxo-17-norkauran-18-oic acid β-D-glucopyranosyl ester | N | N | N |
| Dulcoside A | N | N | N |
| Steviol glucuronide | N | N | N |
| REB C | N(S+) | N(S+) | +S |
| REB F | N | N | N(S+) |
| REB D | N | N | N(S+) |
| 13-[(2-O-β-D-glucopyranosyl-3-O-β-D-glucopyranosyl]-β-D-glucopyranosyl)oxyl]-17-hydroxy-kaur-15-en-18-oic acid β-D-glucopyranosyl ester | N | N | N(S+) |
| 13-[(2-O-(3-O-α-D-glucopyranosyl)-β-D-glucopyranosyl-3-O-β-D-glucopyranosyl-β-D-glucopyranosyl)oxy] kaur-16-en-18-oic acid β-D-glucopyranosyl ester | N(S+) | N(S+) | +S |
| 13-[(2-O-β-D-glucopyranosyl-3-O-(4-O-α-D-glucopyranosyl)-β-D-glucopyranosyl-β-D-glucopyranosyl)oxy] kaur-16-en-18-oic acid β-D-glucopyranosyl ester | T | T | N |
| 13-[(3-O-β-D-glucopyranosyl-β-D-glucopyranosyl)oxy] kaur-16-en-18-oic acid β-D-glucopyranosyl ester | N | N | N |
| 13-hydroxy-kaur-16-en-18-oic acid β-D-glucopyranosyl ester | N | N | N |
| Mogroside V | N | N | N |
| Rubusoside | N(S+) | N(S+) | ++S |

T: Slight thicker-like sweetness (not intensity factor).
N: No difference
N(S+): No difference but slightly more sweet (0.5-0.75%)
+S: More sweetness intensity (~1.0% SE)
++S: Much more sweetness intensity (~2.0% SE)

As can be seen from Table 2, Rubusoside, at a concentration of 50 ppm was found to enhance the 6% sucrose by about 2% SE. REB C and 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester at concentrations of 100 ppm and 25 ppm, respectively, enhanced the sweetness of the composition from about 6% SE (sucrose control) to about 7% SE. A higher sweet enhancement effect was found to be present in sucrose than in glucose and fructose among these three entities.

Example 2

Steviol Glycosides Sweetness Detection Threshold Estimation

Preliminarily, a 1,000 ppm steviol glycoside solution was prepared by dissolution of 20 mg steviol glycoside in 20 mL purified water. An aliquot (10 mL) of this solution was diluted to 20 mL with water to obtain a 500 ppm solution. Additional 1:1 serial dilutions were used to obtain 250, 125, 62.5, 31.2 and 15.6 ppm solutions. Those solutions were then tasted in ascending order of concentration by one experienced subject by using the sip-and-spit protocol disclosed herein. The subject's estimated sweetness detection threshold was determined to be at the lowest concentration at which sweetness was definitely observed.

Thereafter, a 200 ppm solution of rubusoside was prepared by dissolution of 20 mg rubusoside in 200 mL purified water. An aliquot (50 mL) of this solution then was diluted to 100 mL with water to obtain a 100 ppm solution. Additional 1:1 serial dilution steps were used to prepare 50 and 25 ppm solutions. These solutions then were tasted in ascending order of concentration by 5 experienced subjects by the sip-and-spit protocol.

All subjects agreed on the absence of taste in the 50 ppm solutions of rubusoside.

Rubusoside and 6% Sucrose Sweetness Enhancement Test

Reference samples were prepared at 6, 7, 8, 9 and 10% sucrose (w/v). The test sample was prepared by addition of 50 mg of rubusoside to 1 L of 6% sucrose. The test sample was mixed with five sucrose control samples of various concentrations in the 6-10% sucrose range. Each of the six samples was then individually rated for sweetness intensity on a scale of 6-10 relative to the 6-10% sucrose references.

The Sweetness Intensity Rating ranged from 6 to 10, for each subject. The 6% sucrose reference sample had an average sweetness intensity rating of 6.1 while the rubusoside and 6% sucrose test sample had an average sweetness intensity rating of 7.9, indicating that the rubusoside increased the perception of sweetness intensity.

Example 3

Purification of Crude Rubusoside

About 30 grams of crude rubusoside (63.7%) obtained from Waterstone Tech was dissolved in about 100 ml of 60:40 MeOH and water. A column was packed with 300 grams of Reversed-Phase material obtained from Phenomenex (Sepra C18; 50 um, 65 A) that was suspended in 1000 ml 60:40 MeOH and water. The suspended 30 grams of rubusoside was dissolved in 100 ml of 60:40 MeOH and water onto the column after removing the 1000 ml 60:40 MeOH and water from the packed column. The column was eluted with 2000 ml of 70:30 MeOH and water, and forty fractions were collected (about 50 ml of each). Fractions 6-19 showed the presence of rubusoside. Fractions 6-19 were combined and concentrated in a rotavaporator under vacuum that yielded 6.6 grams dry powder. From this, 3 grams of the material was taken in a round bottomed flask and added with 15 ml of MeOH. The mixture was refluxed under stirring for 1 hour and cooled to room temperature over a period of 30 minutes. The mixture was stirred for 30 more minutes and the solids filtered, washed with 5 ml of organic solvent, dried under vacuum at about 50° C. for 48 hours, and submitted for HPLC analysis. The HPLC analysis reported the purification of rubusoside at a purity 94.6%.

Example 4

Steviol Glycosides Sweetness Detection Threshold Estimation in Lemon-Lime, Carbonated Beverage at 4° C.

Preliminarily, multi-levels of steviol glycoside solution in lemon-lime beverage at 4° C. were prepared by mixing the calculated formulations to obtain 450, 350, 250 and 150 ppm of steviol glycoside solutions. Those solutions were then tasted by six experienced subjects by using the sip-and-spit protocol disclosed herein. The sweetness recognition threshold for rubusoside was determined to be averaged 150 ppm. For sweetness enhancement test of rubusoside in lemon-lime beverage, it was decided to use a 10 percent less of sweetness recognition threshold or 135 ppm (150−10%=135).

Rubusoside and Sweetness Enhancement Test in Lemon-Lime, Carbonated Beverage at 4° C.

Three test products were prepare: a control beverage comprising 10.52% High Fructose Starch Syrup (HFSS), a lemon-lime prototype comprising 8% HFSS and 135 ppm rubusoside, and a standard lemon-lime beverage comprising 8% HFSS. The test products are listed in Table 3.

TABLE 3

Test Product Compositions:

| Beverage System | Variant |
|---|---|
| Lemon-Lime Flavored Beverage (US) | 8% HFSS + Rubusoside (135 ppm) |
| Lemon-Lime Flavored Beverage (US) | 8% HFSS |
| Lemon-Lime Flavored Beverage (US) | 10.52% HFSS Control |

As part of study design, a full sensorial profile was determined using a Complete Block Design (CBD). All products were randomized and balanced. Each assessor evaluated all products sequentially. Each product was evaluated three times by each assessor. Eight minute time breaks between tasting samples. Unsalted cracker, 0.75% saline solution and mineral grade water was used as a mouth rinse and refresher before each sample. Each assessor was served 75 ml of chilled beverage (4° C.+/−1° C.). The results of the full sensorial profiled is summarized in Table 4. Table 5 provides the categories and the descriptions of the various attributes identified in Table 4.

TABLE 4

Detailed Descriptive Analysis Results

|  | Control |  | 8% HFSS + Rubusoside |  | 8% HFSS |  |
|---|---|---|---|---|---|---|
| Sweet Citrus Aroma | 1.9 | b | 2.2 | a | 2.1 | ab |
| Lemon Aroma | 2.3 | ab | 2.5 | a | 2.2 | b |
| Lime Aroma | 1.5 | ab | 1.4 | b | 1.6 | a |
| Citral Aroma | 1.7 | a | 1.5 | a | 1.6 | a |
| Piney Aroma | 0.4 | a | 0.1 | c | 0.3 | b |
| Overall Aroma | 3.0 | ab | 3.1 | a | 2.9 | b |
| Carbonation | 5.0 | a | 5.1 | a | 4.9 | a |
| Cloying | 2.3 | a | 2.1 | a | 2.2 | a |
| Astringent | 1.5 | c | 1.8 | b | 2.4 | a |
| Sweet Citrus Flavour | 2.3 | a | 1.4 | b | 1.4 | b |
| Orange Flavour | 0.5 | a | 0.3 | b | 0.2 | b |
| Lemon Flavour | 2.5 | a | 2.6 | a | 2.4 | a |
| Lime Flavour | 2.7 | a | 1.7 | c | 2.1 | b |
| Citral Flavour | 1.4 | b | 1.7 | a | 1.5 | ab |
| Piney Flavour | 0.1 | a | 0.3 | a | 0.2 | a |
| Sweet Taste | 3.8 | a | 3.1 | b | 2.5 | c |
| Salt Taste | 0.4 | a | 0.4 | a | 0.4 | a |
| Sour Taste | 2.2 | a | 2.3 | a | 2.5 | a |
| Bitter Taste | 0.6 | c | 0.8 | b | 1.4 | a |
| Overall Flavour | 3.7 | a | 3.6 | ab | 3.4 | b |
| Sweet Citrus Aftertaste | 1.3 | a | 1.0 | b | 0.5 | c |
| Lemon Aftertaste | 1.4 | a | 1.5 | a | 1.6 | a |
| Lime Aftertaste | 1.1 | b | 0.9 | b | 1.3 | a |
| Citral Aftertaste | 1.3 | a | 1.1 | a | 1.1 | a |
| Sweet Aftertaste | 2.5 | a | 2.0 | b | 1.5 | c |
| Bitter Aftertaste | 0.5 | c | 0.9 | b | 1.3 | a |
| Sour Aftertaste | 1.2 | a | 1.3 | a | 1.5 | a |

TABLE 4-continued

Detailed Descriptive Analysis Results

|  | Control |  | 8% HFSS + Rubusoside |  | 8% HFSS |  |
|---|---|---|---|---|---|---|
| Cloying Afterfeel | 2.5 | a | 1.9 | b | 1.5 | c |
| Drying After Feel | 1.5 | c | 1.8 | b | 2.1 | a |
| Overall Aftertaste | 2.8 | a | 2.7 | ab | 2.4 | b |

*Samples that appear with different letter grouping have statistically significant differences at 95% CL.

TABLE 5

Lexicon of Analysis Terms

| Attribute Name | Category | Definition |
|---|---|---|
| Sweet citrus | Aroma, Flavor, Aftertaste. | The overall aromatics/flavor associated with sweet candy lemon/lime |
| Orange | Aroma, Flavor, Aftertaste. | The overall aromatics/flavor associated with orange |
| Lemon | Aroma, Flavor, Aftertaste. | The overall tart, sharp aromatics/flavor associated with lemon |
| Lime | Aroma, Flavor, Aftertaste. | The overall rich, green aromatics/flavor associated with lime |
| Citral | Aroma, Flavor, Aftertaste. | The overall aromatics/flavor associated the peel/oil of lemon, lime and lemongrass |
| Piney | Aroma, Flavor, Aftertaste. | The overall aromatics/flavor associated with pine disinfectants. Reminiscent of Flash floor cleaner. |
| Overall | Aroma, Flavor, Aftertaste. | The combined intensity of all perceived aromatics or flavor. |
| Carbonation | Mouthfeel | The amount of tingling, burning sensation in the mouth and throat. |
| Cloying | Mouthfeel, Afterfeel | The thick excessive sweetness sensation left in the mouth after swallowing the beverage, resembling syrup consistency. |
| Astringent | Mouthfeel | Dry, puckering mouthfeel caused by tannins. Reminiscent of black tea. |
| Sweet | Taste, Aftertaste | The sweet taste associated with sucrose, and artificial sweeteners |
| Salt | Taste, Aftertaste | The salt taste associated with table salt |
| Sour | Taste, Aftertaste | The sour taste associated with citric acid/lemon juice |
| Bitter | Taste, Aftertaste | The bitter taste associated with caffeine, tonic water and sucrose octaacetate. |
| Drying | Afterfeel | Drying sensation left in the mouth. |

Figure 1:
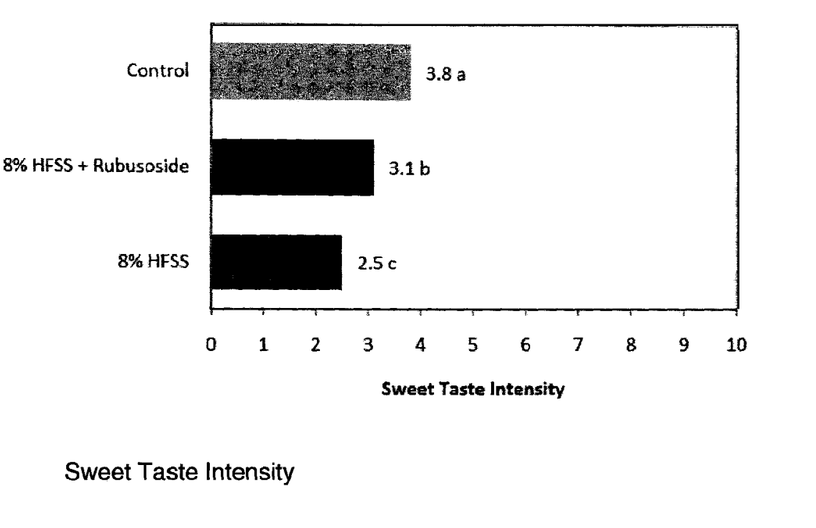
FIG. 1 shows a bar graph of the sweet taste intensity results of Example 4.

As depicted in FIG. 1, the lemon-lime prototype comprising 8% HFSS and 135 ppm rubusoside was significantly sweeter than the standard lemon-lime beverage comprising 8% HFSS made without rubusoside. Interpolation of the data indicates that the addition of rubusoside provided a sweetness equivalence of 9.2% HFSS which is 1.15 times as sweet as the prototype without rubusoside.

Example 5

Sweet Modulation Effect of REBA with Five Selected Steviol Glycosides at Their Sub-Sweetness Detection Thresholds in Phosphoric Acid at Room Temperature Preliminarily, five steviol glycosides at their sweetness detection thresholds were identified based on their positive individual sweet modulation effects on REB A. It was decided to combine these five steviol glycoside at their significantly lower levels or sub-thresholds to determine its sweet modulation effect of REB A in phosphoric acid solution, pH 2.5. Table 5 lists the five steviol glycosides at their sweetness detection thresholds and their total SDT concentration.

TABLE 5

The estimation sweetness/off-taste threshold results of 5 selected steviol glycosides in water at room temperature (RT) and their total concentration.

| Compound | Sweetness Threshold Level (ppm) |
|---|---|
| Rebaudioside B (REB B) | 25 |
| 13-[(2-O-β-D-glucopyranosyl-3-O-β-D-glucopyranosyl-β-D-glucopyranosyl)oxy]-16-hydroxy kauran-18-oic acid β-D-glucopyranosyl ester-DAQ 1 | 700 |
| 13-[(2-O-β-D-glucopyranosyl-3-O-β-D-glucopyranosyl-β-D-glucopyranosyl)oxy]-16-hydroxy kauran-18-oic acid-DAQ 2 (max. level for solubility) | 500 |
| 13-[(2-O-β-D-glucopyranosyl-3-O-β-D-glucopyranosyl-β-D-glucopyranosyl)oxy] kaur-15-en-18-oic acid-DAQ 4 | 35 |
| 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester-IMP-2 | 250 |
| Total ppm: | 1,510 |

The REB A with and without five positive steviol glycosides at their sub-thresholds (at a total low 62 ppm as shown in Table 6) were then prepared.

TABLE 6

The approximated concentrations of positive sweet modulated by-products of 500 ppm REB A at two storage months in phosphoric acid at RT.

| Compound | Levels After 2 Month of Storage (ppm) |
|---|---|
| Rebaudioside B (REB B) | 17 |
| 13-[(2-O-β-D-glucopyranosyl-3-O-β-D-glucopyranosyl-β-D-glucopyranosyl)oxy]-16-hydroxy kauran-18-oic acid β-D-glucopyranosyl ester-DAQ 1 | 10 |
| 13-[(2-O-β-D-glucopyranosyl-3-O-β-D-glucopyranosyl-β-D-glucopyranosyl)oxy]-16-hydroxy kauran-18-oic acid-DAQ 2 (max. level for solubility) | 33 |
| 13-[(2-O-β-D-glucopyranosyl-3-O-β-D-glucopyranosyl-β-D-glucopyranosyl)oxy] kaur-15-en-18-oic acid-DAQ 4 | 1 |

TABLE 6-continued

The approximated concentrations of positive sweet modulated by-products of 500 ppm REB A at two storage months in phosphoric acid at RT.

| Compound | Levels After 2 Month of Storage (ppm) |
|---|---|
| 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester-IMP-2 | 1 |
| Total ppm: | 62 |

The control REB A sample at 500 ppm was prepared by adding non-moisture compensated 0.10 g into a 200 mL phosphoric acid solution. The phosphoric acid solution was prepared by adding ca. 0.4 mL phosphoric acid into 1 L carbon-treated (CT) water until its pH reaches 2.5. A 100 mL portion of 500 ppm REBA was taken and 17 ppm REBB, 10 ppm DAQ 1, 33 ppm DAQ 2, 1 ppm DAQ 4 and 1 ppm IMP-2 were added into it. The mixture was moderately stirred at room temperature (RT). The sample at RT was then evaluated against their control of the similar matrix system by one qualified and experienced panelist for any potential, sweet modulation differences.

The sweet tasting quality improvement of REB A in phosphoric acid at RT was clearly observed with the total low 62 ppm sub-Sweetness Detection Threshold steviol glycosides as they contain a more sugar-like tasting quality than the control REB A.

What is claimed is:

1. A method for increasing the sweetness of a carbohydrate sweetener or a synthetic high potency sweetener in a sweetenable composition comprising:
adding to the sweetenable composition at least one natural sweetness enhancer chosen from 13-[(2-O-(3-O-α-D-glucopyranosyl)-β-D-glucopyranosyl-3-O-β-D-glucopyranosyl-β-D-glucopyranosyl)oxy]kaur-16-en-18-oic acid β-D-glucopyranosyl ester and 13-[(2-O-β-D-glucopyranosyl-3-O-β-D-glucopyranosyl]-β-D-glucopyranosyl)oxy]-17-hydroxy-kaur-15-en-18-oic acid β-D-glucopyranosyl ester; wherein the sweetness enhancer is present in the sweetenable composition in an amount that is at or below the sweet detection threshold level of the sweetness enhancer and the sweetener and the sweetness enhancer are different.

2. The method of claim 1, wherein the carbohydrate sweetener is sucrose or high fructose corn syrup.

3. The method of claim 1, wherein the sweetenable composition is a beverage.

4. The method of claim 3, wherein the beverage is a carbonated beverage.

5. The method of claim 4, wherein the carbonated beverage is a cola or lemon-lime beverage.

6. The method of claim 3, wherein the beverage is a flavored water.

7. The method of claim 6, wherein the flavored water is supplemented with a functional ingredient chosen from a vitamin, a mineral, an antioxidant, an herbal product, and a pharmaceutical product.

8. The method of claim 1, wherein the sweetness enhancer is 13-[(2-O-(3-O-α-D-glucopyranosyl)-β-D-glucopyranosyl-3-O-β-D-glucopyranosyl-β-D-glucopyranosyl)oxy] kaur-16-en-18-oic acid β-D-glucopyranosyl ester, and wherein the sweetness enhancer is present in the sweetenable composition in an amount less than or equal to 25 ppm.

9. The method of claim 8, wherein the sweetness enhancer is present in the sweetenable composition in an amount less than 20 ppm.

10. The method of claim 1, wherein the sweetness enhancer is 13-[(2-O-β-D-glucopyranosyl-3-O-β-D-glucopyranosyl)-β-D-glucopyranosyl)oxy]-17-hydroxy-kaur-15-en-18-oic acid β-D-glucopyranosyl ester, and wherein the sweetness enhancer is present in the sweetenable composition in an amount less than or equal to 250 ppm.

11. The method of claim 10, wherein the sweetness enhancer is present in the sweetenable composition in an amount less than 200 ppm.

* * * * *